US005739675A

United States Patent [19]

Green et al.

[11] Patent Number: 5,739,675

[45] Date of Patent: Apr. 14, 1998

[54] REMOVABLE POWERTRAY FOR A SELF CONTAINED MOTOR GENERATOR SET

[75] Inventors: Vincent D. Green, East Syracuse; Todd W. Wilson, North Syracuse; Mark W. Colton, Clay, all of N.Y.

[73] Assignee: Carrier Corporation, Syracuse, N.Y.

[21] Appl. No.: 578,400

[22] Filed: Dec. 26, 1995

[51] Int. Cl.$^6$ .......... H02K 5/00

[52] U.S. Cl. .......... 322/1; 137/899

[58] Field of Search .......... 123/2; 174/50; 137/899; 322/1; 290/1 B

[56] References Cited

U.S. PATENT DOCUMENTS

| | | | |
|---|---|---|---|
| 4,548,164 | 10/1985 | Ylonen et al. | 123/2 |
| 4,732,360 | 3/1988 | Bodenheimer | 248/645 |
| 4,748,824 | 6/1988 | Wakabayashi et al. | 62/239 |
| 4,811,569 | 3/1989 | Welch et al. | 62/239 |
| 4,835,405 | 5/1989 | Clancey et al. | 290/1 A |
| 4,871,922 | 10/1989 | Heinrich et al. | 290/1 B |
| 5,181,541 | 1/1993 | Bodenheimer | 137/899 |
| 5,433,175 | 7/1995 | Hughes et al. | 123/2 |

*Primary Examiner*—Steven L. Stephan
*Assistant Examiner*—Nicholas Ponomarenko

[57] ABSTRACT

A self contained engine driven electrical generator having two easily separable major components. The first is a support section which includes the fuel tank for the generator and structural support means interconnecting portions of the fuel tank. The support section also facilitates mounting the generator to a refrigerated container with which it is adapted to be used. The second section is a power generation section, which includes the engine, the electrical generator and the radiator for cooling the engine, all integrally assembled into an easily removable unit. Other major components of the generator, including a control box, battery, battery charger, air filter, fuel filter, and muffler form integral parts of the power generation section. All mechanical, fuel and electrical connections may be readily disconnected to facilitate removal of the power generation section from the support section.

13 Claims, 10 Drawing Sheets

REMOVABLE POWERTRAY FOR A SELF CONTAINED MOTOR GENERATOR SET

BACKGROUND OF THE INVENTION

The present invention relates to self contained engine driven electrical generators. More particularly, the invention relates to a self contained engine driven electrical generator of the type used in connection with a refrigerated transport container wherein the engine, generator and other principal components are assembled in a single module, which may be readily detached and removed from the unit to which it is operably connected.

An increasingly popular way of transporting goods makes use of removable cargo carrying containers, commonly referred to as "intermodal" containers, which are adapted for transport over both land and water. Such containers are designed for transport by truck or rail to a freight terminal or ship loading dock, where they may be transferred to a ship for overseas delivery.

Many of such containers are provided with refrigeration units which allow them to transport perishable goods therein. The refrigeration units attached to such containers include an electric motor for driving a refrigerant compressor forming a part of the unit. As a result, they require a source of electrical power for operation. When located at a freight terminal, a refrigerated container is provided with electrical power through a connection to a conventional source of electrical power. When located on a ship, a refrigerated container receives electrical power from the ship's electrical system. When being transported by road, rail or when no other power source is available, a self contained temporary power source which includes a motor generator set, may be mounted directly to the refrigerated container.

Since the generator set is a self-contained source of auxiliary power, it is necessary that an integral part thereof be a fuel tank for the motor, which is typically a diesel engine. Many generator sets are required to have the capability to provide uninterrupted service for an extended length of time. For example, for transcontinental rail shipping, it is desirable to have a generator set which is capable of operating for more than 130 hours without requiring refueling. Such extended use capabilities also will increase the reliability of the system and decrease operating costs. Accordingly, it is desirable to provide a high capacity integral fuel tank for such a generator set.

It should be appreciated that space is extremely limited in the design of such s generator set. Such space limitations are a result of the environment in which they are used wherein there are limitations on components extending beyond a prescribed envelope universally defined by the width of the containers on which they are used. Also, because the units are quite often mounted on containers being towed by tractor trailers, size limitations are dictated by the necessity of providing adequate clearance between the unit and the tractor unit. Further space limitations are dictated by the requirement that the generator set not extend vertically above the top of the container on which it is mounted nor should it extend downward such that it would interfere with the condenser discharge and the operating controls of the refrigeration unit.

One approach to achieving a high capacity fuel tank is to provide a substantially U-shaped fuel tank having a lower section, which underlies and supports the motor generator and other components of the generator set and which comprises towers which extend upwardly on both sides of the generator set. It is desirable for these towers to be as high as possible, within the confines of the unit, to maximize fuel capacity.

As with any mechanical device, the ease and quickness with which a unit may be serviced is considered to be extremely important. In prior art, transport generator sets servicing of the engine and generator has required removal of the engine and generator assembly from the unit. Such removal has required considerable time in that many of the components such as the radiator, control box and battery are mounted to the generator set frame. As a result, if the engine and generator unit requires service and must be pulled out of the unit, considerable time is required in disconnecting electrical wiring, draining radiator coolant, disconnecting fuel lines and other interfaces between the engine and generator and the generator set frame and other components mounted to it.

SUMMARY OF THE INVENTION

According to the present invention, a self contained engine driven electrical generator comprises a support section which includes a fuel tank, which defines a structural support surface. The structural support surface of the fuel tank is provided with a plurality of mounting devices. The generator also includes a separate power generation section, which comprises an engine, an electrical generator drivingly coupled to the engine and a radiator for cooling the engine. The radiator is structurally attached to and supported by the engine. The engine and the generator are each provided with a plurality of mounting devices, each of which is located so as to align with one of the mounting devices on the structural support surface of the fuel tank when the power generator section is placed thereupon. Means are provided for interconnecting the mounting devices on the support surface with the mounting devices on the engine and the generator with which they are aligned.

BRIEF DESCRIPTION OF THE DRAWINGS

This invention may be better understood and its objects and advantages will become apparent to those skilled in the art by reference to the accompanying drawings, in which.

DESCRIPTION OF THE PREFERRED EMBODIMENT

Figure 1:
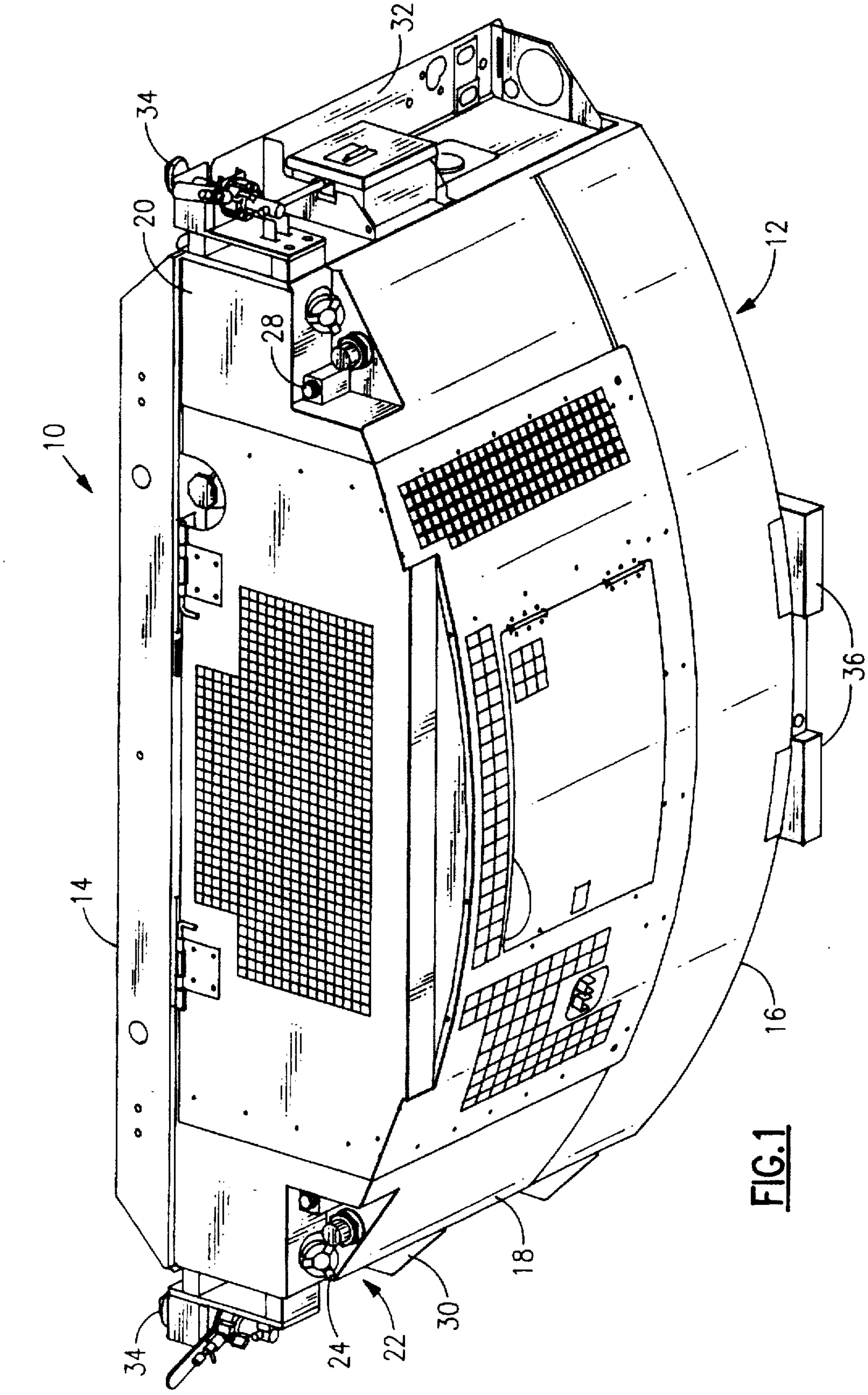
FIG. 1 is a perspective view of a self contained generator set according to the present invention with the outer cover installed.

FIG. 1 is a perspective view of a diesel driven generator set 10, which is adapted for mounting on the end of refrigerated container in order to provide electric power to a refrigeration unit which is also mounted on the container. In operation, the generator set 10 provides a constant electrical power supply for operation of the all electric refrigeration unit. Neither the container nor the refrigeration unit are shown in the drawings or will be described herein as they are conventional and well known in the art. A container refrigeration unit adapted for mounting on a refrigerated container, and with which the generator set of the present invention may be used, is manufactured and sold by the Carrier Transicold Division of Carrier Corporation and marketed as Model Series NT.

The structural framework of the generator set comprises a U-shaped fuel tank generally designated by reference numeral 12 and a number of structural elements, including an angle iron 14, which extends across substantially the entire back side of the generator set.

The fuel tank 12, fabricated from structural steel plate, comprises a lower section 16, which extends across substantially the entire bottom of the generator set 10. Extending from the left and right hand sides of the lower tank 16 are left and right hand tower portions of the fuel tank, 18 and 20, respectively. Each of the towers 18 and 20 is fluidly interconnected with the lower tank section 16. Each of the towers 18 and 20 is provided, at its upper end thereof, with a fuel fill shelf 22, which is provided with an appropriate fuel fill 24, fuel gage 26 and fuel vent 28.

The previously described structural angle 14 is welded to the top of the back side of the fuel towers 18 and 20. Other structural elements include left and right hand vertically extending structural members 30 and 32, respectively, located at the left and right hand ends of the generator set. Preferably, these structural elements 30 and 32 are welded to the left and right hand facing surfaces of the fuel tank towers 18 and 20, respectively. Mounted to the upper end of the structural elements 30 and 32 are suitable clamps 34, well known in the art, which are adapted to structurally attach the generator set 10 to a refrigeration container as is well known in the art.

Underlying the lower portion 16 of the fuel tank 12 are a pair of structural forklift pockets 36, which form an integral part of the generator set structure and facilitate engagement by a forklift for lifting the unit and positioning it for attachment to a refrigerated container.

Figure 6:
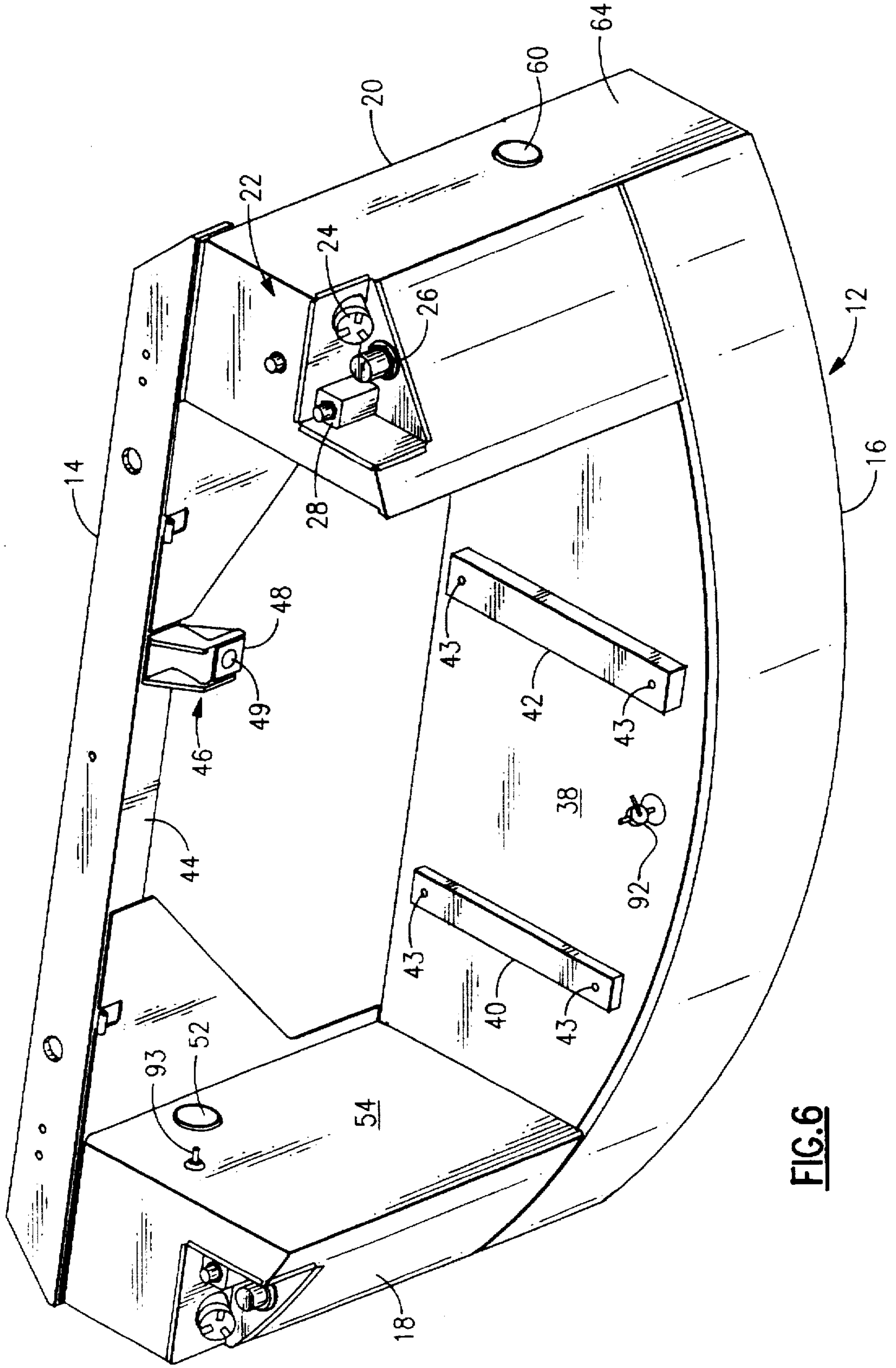
FIG. 6 is a perspective view of the generator set of FIG. 1 with many of the components removed therefrom to show details of the fuel tank and some of the structural components.

As best shown in FIG. 6, the upwardly facing planar surface 38 of the lower portion 16 of the fuel tank 12 has structurally attached thereto, preferably by welding, two structural powertray mounting bars 40 and 42. Each of the mounting bars 40 and 42 is provided with a pair of threaded openings therein, each bearing reference numeral 43. Attached to the downwardly extending leg 44 of the angle iron 14 is an angular mounting bracket 46. The mounting bracket 46 is preferably welded to the leg 44 of the angle iron and is further provided with a vertically extending section 48 having an opening 49 therein adapted to facilitate attachment of the generator sets powertray 50 thereto as will be explained in detail below.

Figure 4:
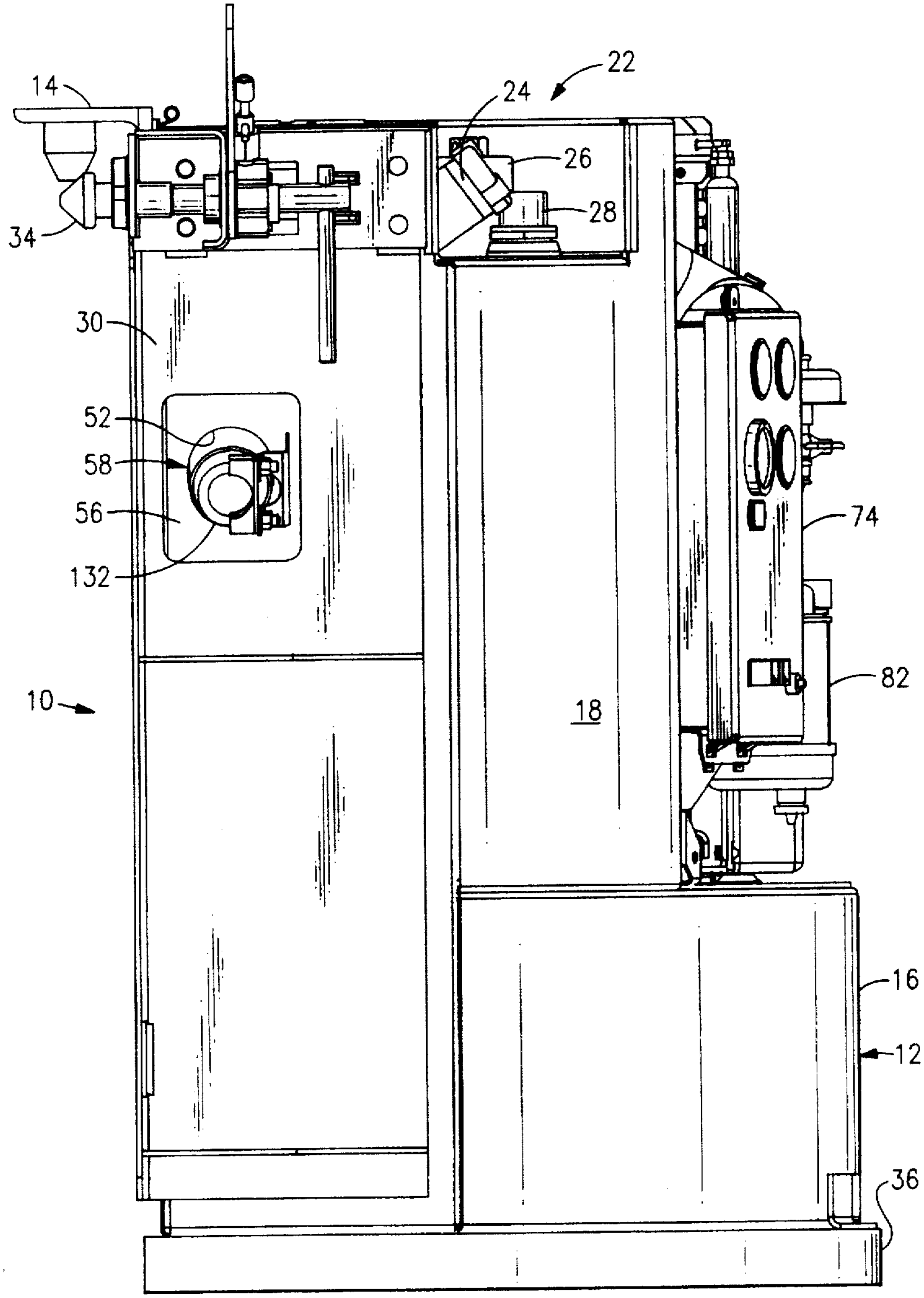
FIG. 4 is a left side view of the unit illustrated in FIG. 2.
Figure 5:
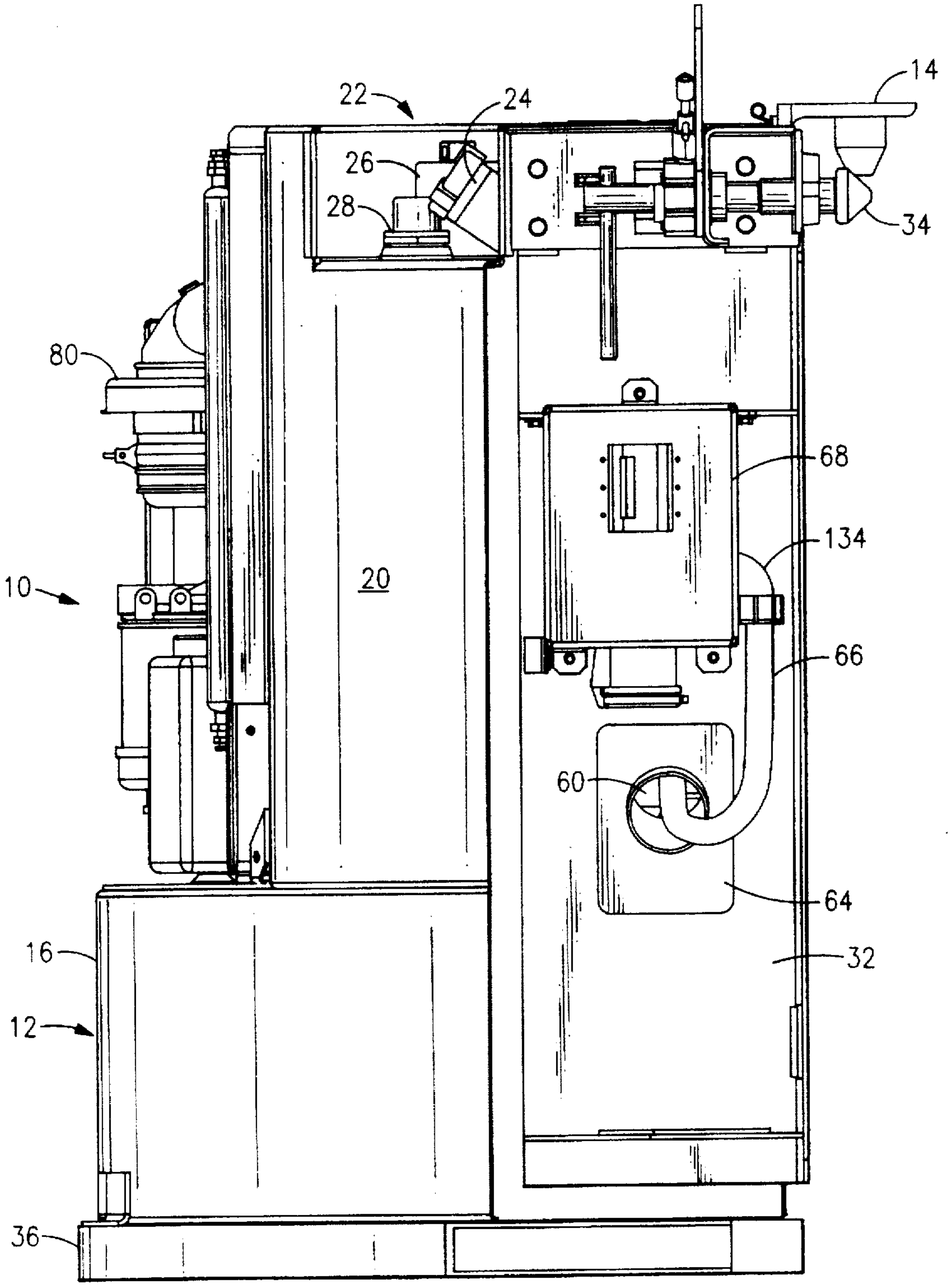
FIG. 5 is a right side view of the unit illustrated in FIG. 2.
Figure 7:
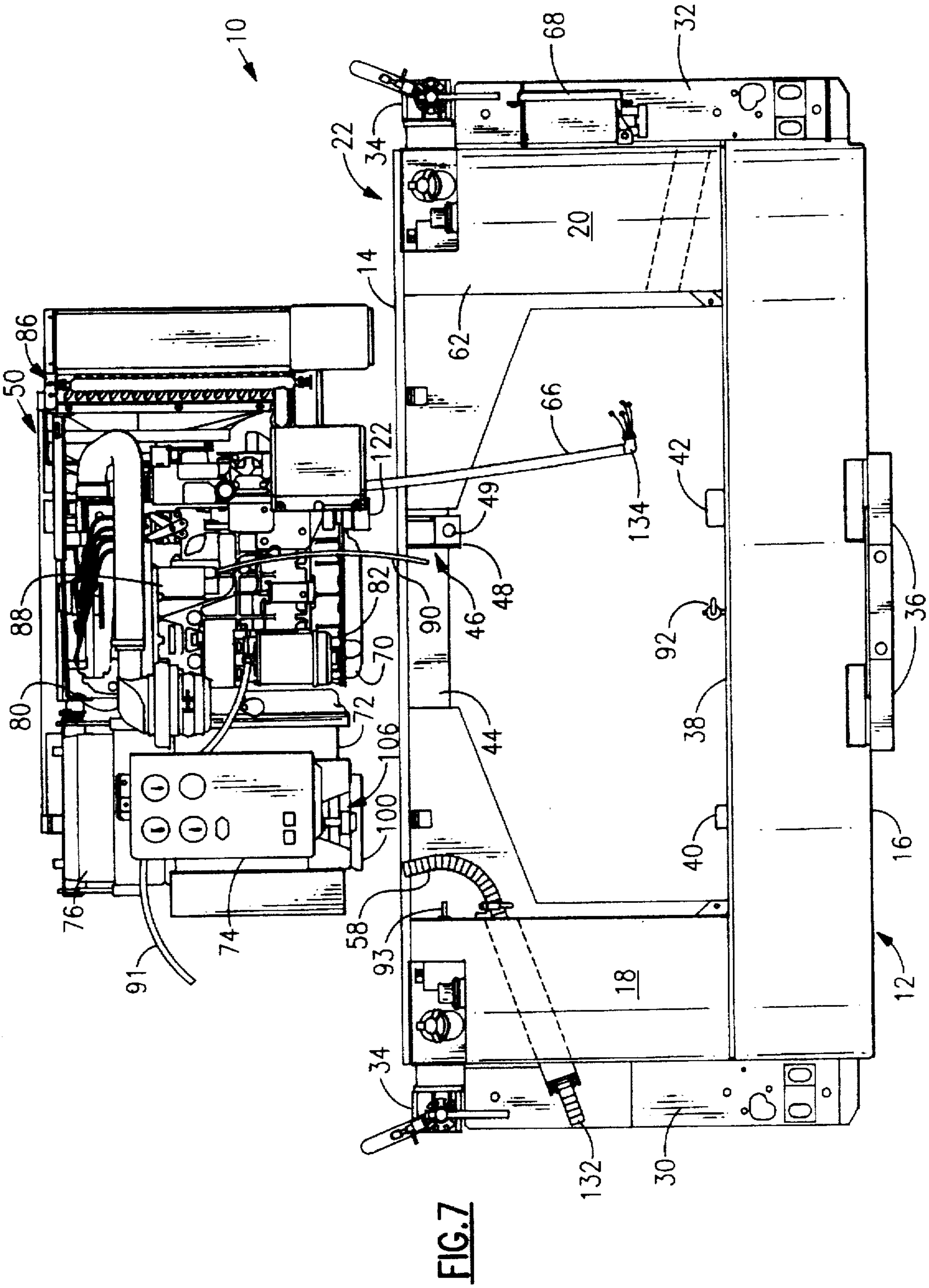
FIG. 7 is a view similar to FIG. 2 showing the power tray removed from the unit.

As best shown in FIGS. 4, 5 and 6, and as shown in phantom lines in FIG. 7, the left hand fuel tank tower 18 is provided with a circular passage 52 extending from the interior wall thereof 54 to the exterior wall 56. The passage is formed from a steel pipe integrally welded to the walls 54 and 56. As will be described in more detail, the exhaust pipe 58 from the engine of the generator set passes through the passage 52. The passage is inclined downward to facilitate drainage.

Similarly, the right hand tower 20 of the gas tank is provided with a passage 60 extending from the interior wall 62 to the exterior wall 64 thereof. This passage 60 is adapted to receive the power cable 66, which interconnects the generator set 10 with a receptacle box 68 mounted on the right hand vertically extending structural member 32.

The term "powertray" 50, as used in connection with the present invention, includes an assembly of all of the major components of the generator set 10 assembled in such a manner that they may all be readily removed as a single unit for servicing. The major components of the powertray will first be identified generally, and then their inter-relationship with one another and points of attachment to the rest of the generator set 10 will be described.

The major components include the engine 70, the generator 72, the control box 74, the battery 76, the battery charger 78, the air filter assembly 80, the fuel filter 82, the muffler assembly 84, and the radiator assembly 86. All of these components comprise the powertray assembly 50, which, as illustrated in FIG. 6, is removable from the remainder of the generator set 10 as an integral unit.

The engine 70 is a vertical in-line water cooled diesel engine. It is provided with a mechanical lift pump 88, which is interconnected through a flexible fuel line 90 to a fuel fitting 92 located in the upper surface 38 of the lower fuel tank 16. The fuel fitting 92 includes a fuel shut-off valve and a clamp 94 or other suitable attachment, which facilitates ready disconnection of the flexible fuel line 90 from the fitting 92. A fuel return line 91 extends from a fitting 93 on the inside wall 95 of the left hand fuel tank tower 18 directly to the fuel filter 82, which is mounted on the engine. Connection of the return line 91 to the fitting 93 is by way of a damp or other suitable attachment, which facilitates disconnection.

The generator 72, in the preferred embodiment, is a brushless, single bearing AC generator, which is coupled directly to the engine fly wheel. The generator provides a constant 460 vac, three phase, 60 hertz electrical supply.

As indicated, the engine 70 and generator 72 are coupled directly to one another, and as will be seen, all other components are mounted to the integral structural unit formed by the combination of the engine and the generator. The engine and the generator are directly mounted to the mounting structure of the generator set 10. Specifically, there are five attachment points, four of which are to the four threaded openings 43 provided in the two mounting bars 40 and 42 and the fifth to the mounting bracket 46.

Figure 8:
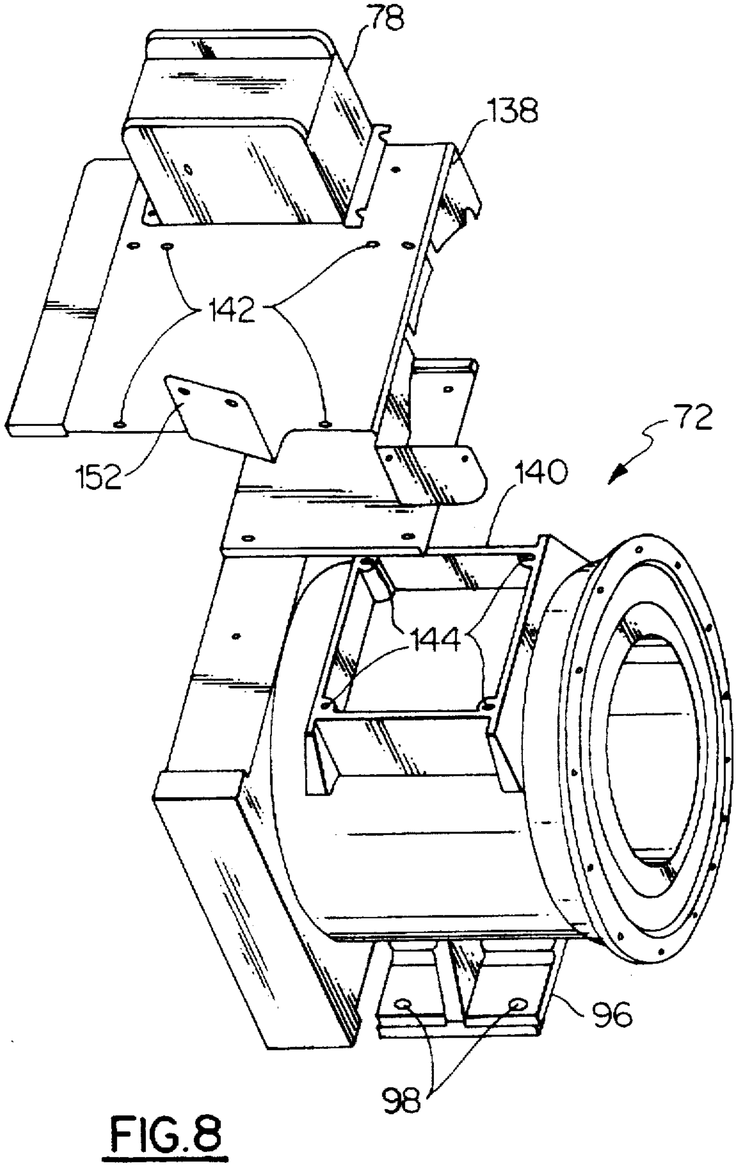
FIG. 8 is a perspective view showing details of mounting of the battery charger to the generator.
Figure 10:
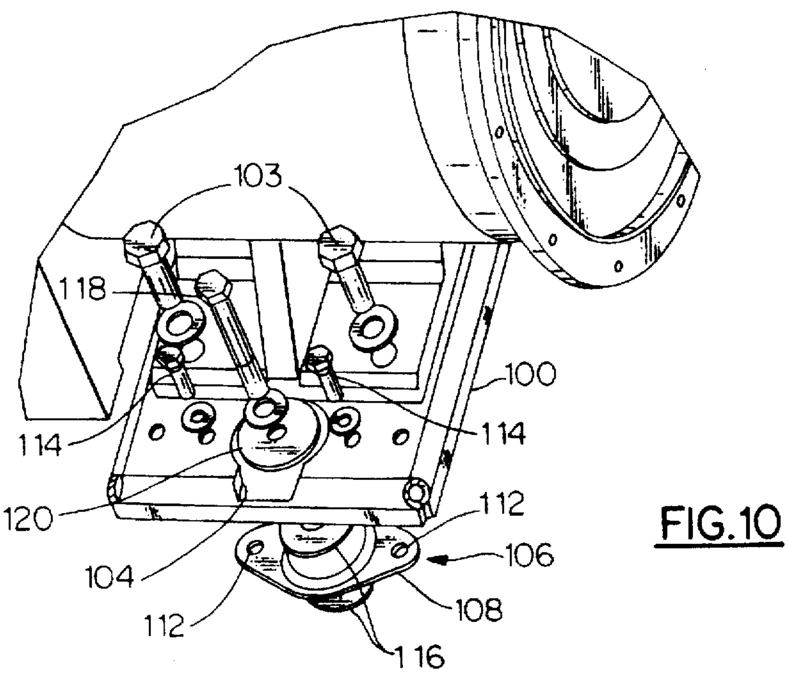
FIG. 10 is a perspective view of the details of the generator mounting arrangement.
Figure 9:
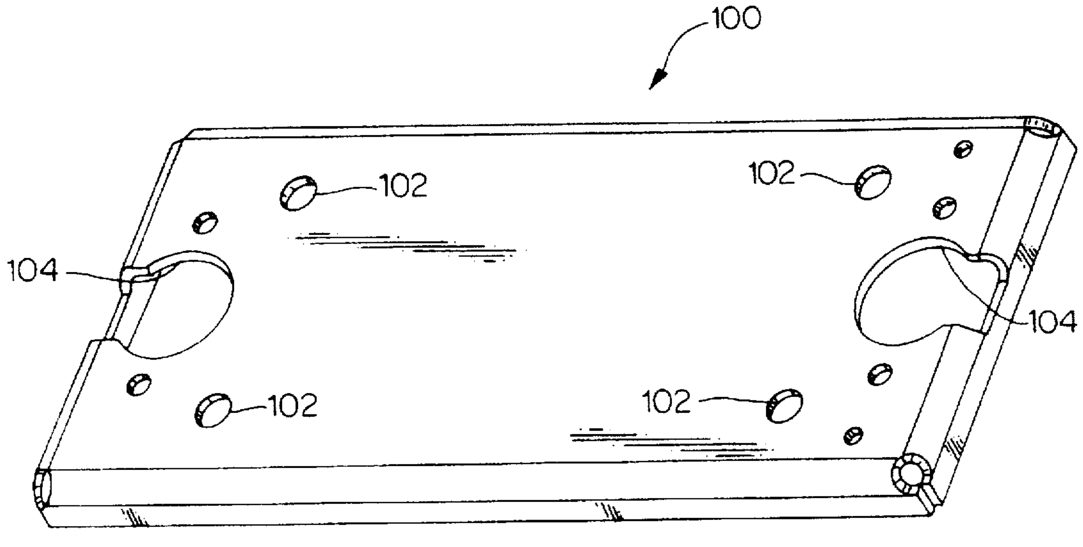
FIG. 9 is a perspective view of the generator mounting channel.

Looking first at FIG. 8, the generator 72 has a mounting foot 96 integrally formed therewith which includes four openings 98 (only two of which are shown) formed therein. FIG. 9 illustrates a generator mounting channel 100 having four openings 102 therein which are located to be aligned with the holes 98 in the generator mounting foot 96. FIG. 10 illustrates the mounting channel 100 in its installed position underlying the generator. Suitable mounting bolts 103 pass through the openings in the mounting foot 96 and the channel 100 and are appropriately secured on the opposite side by threaded nuts (not shown).

As is best seen in FIG. 9 and 10, the mounting channel 100 is provided with large openings 104 at opposite ends thereof, which accommodate shock mount assemblies 106. The shock mounts 106 are conventional and comprise a structural mounting flange 108 adapted to be attached to the mounting channel 100 through openings 110 which mate with axially aligned openings 112 in the shock mount mounting flange. Appropriate threaded fasteners 114 attach the flange 108 to the channel 100. The shock mount includes neoprene rubber elements 116 on opposite sides of the shock mount flange 108. Attachment of the channel 100 to the unit is achieved by use of a threaded fastener 118, which passes through a washer 120 and thence through axially aligned openings (not shown) in the shock mount flange 108 and the neoprene elements 116 and is then received in a mating threaded opening 43 provided in the left hand mounting bar 40. Attachment on the back side of the generator is identical.

Attachment of the engine 70 to the other mounting bar 42 is carried out by use of similar shock mounts 122. These shock mounts are mounted directly to structure which is provided in the oil pan assembly of the engine 70. As with the generator mounting, mounting bolts pass through the shock mount and are threadably received in the mating openings 43 provided in the other mounting bar 42. The arrangement is similar to that described hereinabove in connection with the generator mounting and will not be shown or described in any more detail.

Figure 3:
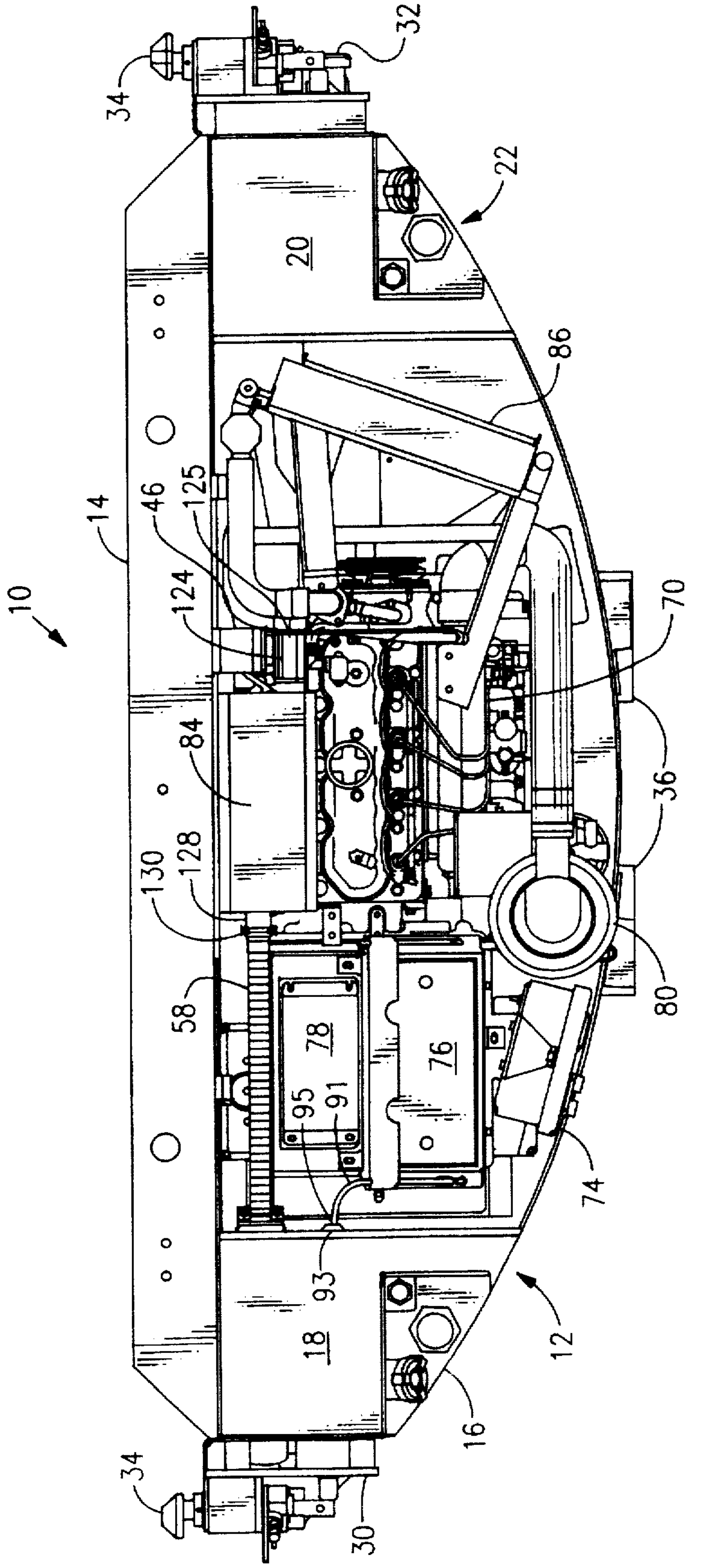
FIG. 3 is a top plan view of the generator set illustrated in FIG. 2.

The fifth structural mounting point for the engine/generator assembly is at the back upper end of the engine 70 as illustrated in FIG. 3 where it is designated generally by reference numeral 124. This attachment is by way of a bracket 125 structurally attached to the engine, which is interconnected to the vertically extending section 48 of the mounting bracket 46 through a shock mount assembly similar to that described above in connection with the generator mount.

It should be appreciated that each of the five shock mount attachments described hereinabove are easily assembled or disassembled from the mating structure of the generator set 10 by the removal of a single bolt or a single nut and bolt assembly.

Figure 2:
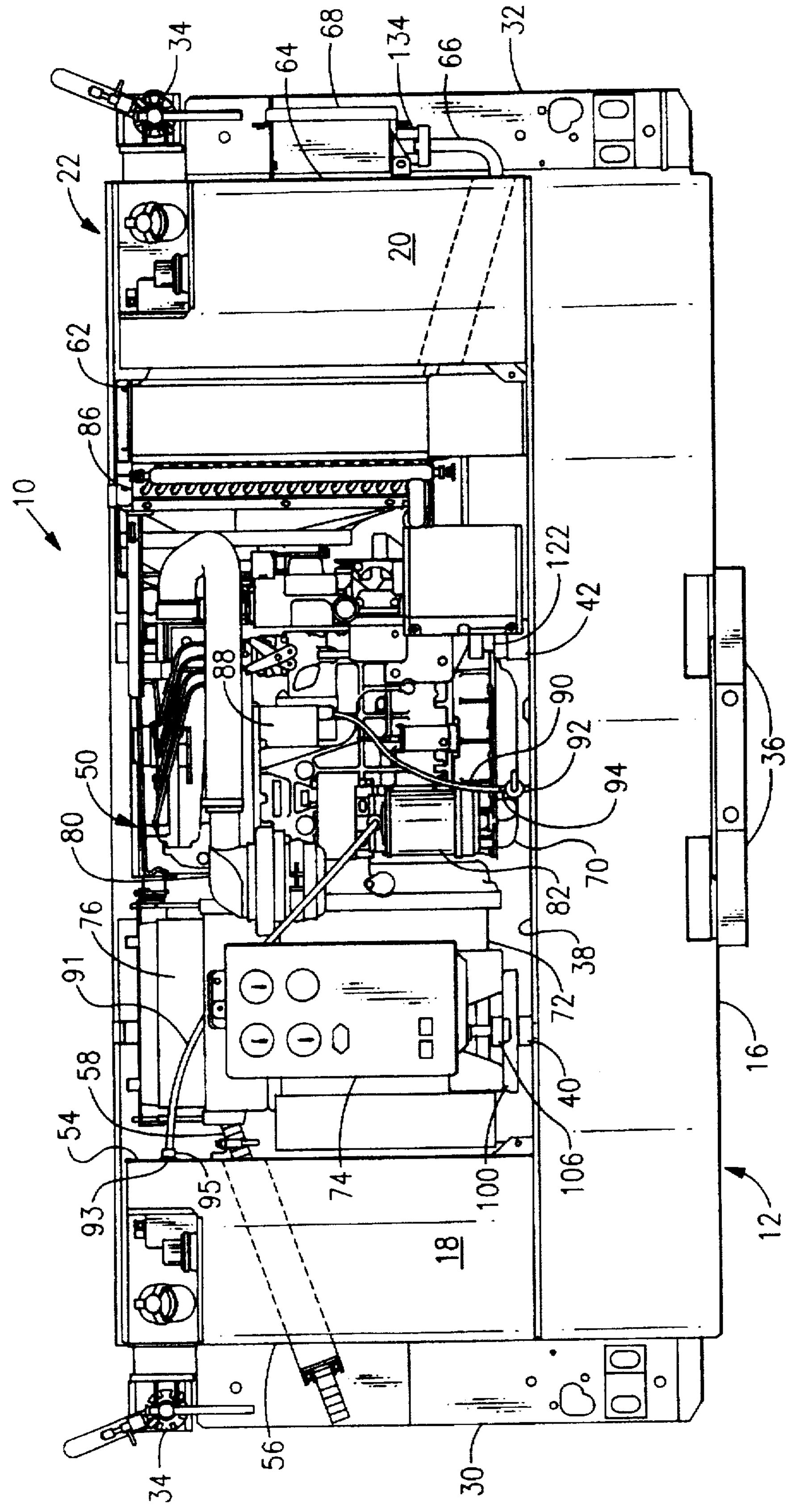
FIG. 2 is a front elevation view of the generator set of FIG. 1 with the cover removed.

The muffler 84 for the engine is best seen in FIG. 3. The muffler is interconnected to the engine exhaust manifold (not shown) in a conventional manner. The engine exhaust pipe 58 is removably attached to the muffler outlet 128 by a conventional muffler clamp 130. The exhaust pipe 58, as illustrated, is a flexible pipe and passes from the muffler outlet 128 into the passage 52, described above, through the left hand fuel tank tower 18 as is best seen in FIG. 2. The exit end 132 of the exhaust pipe 58 extends from the passage 52 to the left of the fuel tank tower 18 to thereby discharge engine exhaust away from the unit. Suitable clamping devices are provided at both the inlet and exit of the passage 52 to secure the exhaust pipe 58.

On the right hand side of the unit, the power cable 66 carrying power from the generator to the receptacle box 68 extends through the passage 60, previously described, which passes through the right hand fuel tank tower 20. As is shown in FIG. 5, the power cable 66 extends from the passage 60 and is connected to the receptacle box 68 by way of an easily connected and disconnected elbow type fitting 134. The engine air filter 80 and the fuel filter 82 are both of convention design and mounted to the engine in a conventional manner and will not be described further.

The battery 76 and the battery charger 78 are both supported by suitable brackets mounted to the upper end of the generator 72. FIG. 8 illustrates the battery charger mounting bracket 138, which is adapted to be mounted to a mounting structure 140 forming a part of the top of the generator. Mating holes 142, 144, respectively, in the mounting bracket 138 and the mounting structure 140 are adapted to receive suitable threaded fasteners (not shown) to secure the bracket 138 to the generator. The battery charger 78, as illustrated in FIG. 8, is in turn attached to the mounting plate 138 by suitable threaded fasteners (not shown).

As best shown in FIGS. 2 and 3, the battery 76 is mounted in a battery tray 146, which in turn is mounted to the battery charger mounting bracket 138. This attachment will not be described in detail as it is conventional.

The control box 74, which contains operating controls for the unit as well as gages for indicating performance of the unit, is mounted to an angular bracket 152, which forms a part of the battery charger mounting plate 138, as illustrated in FIG. 8.

Figure 11:
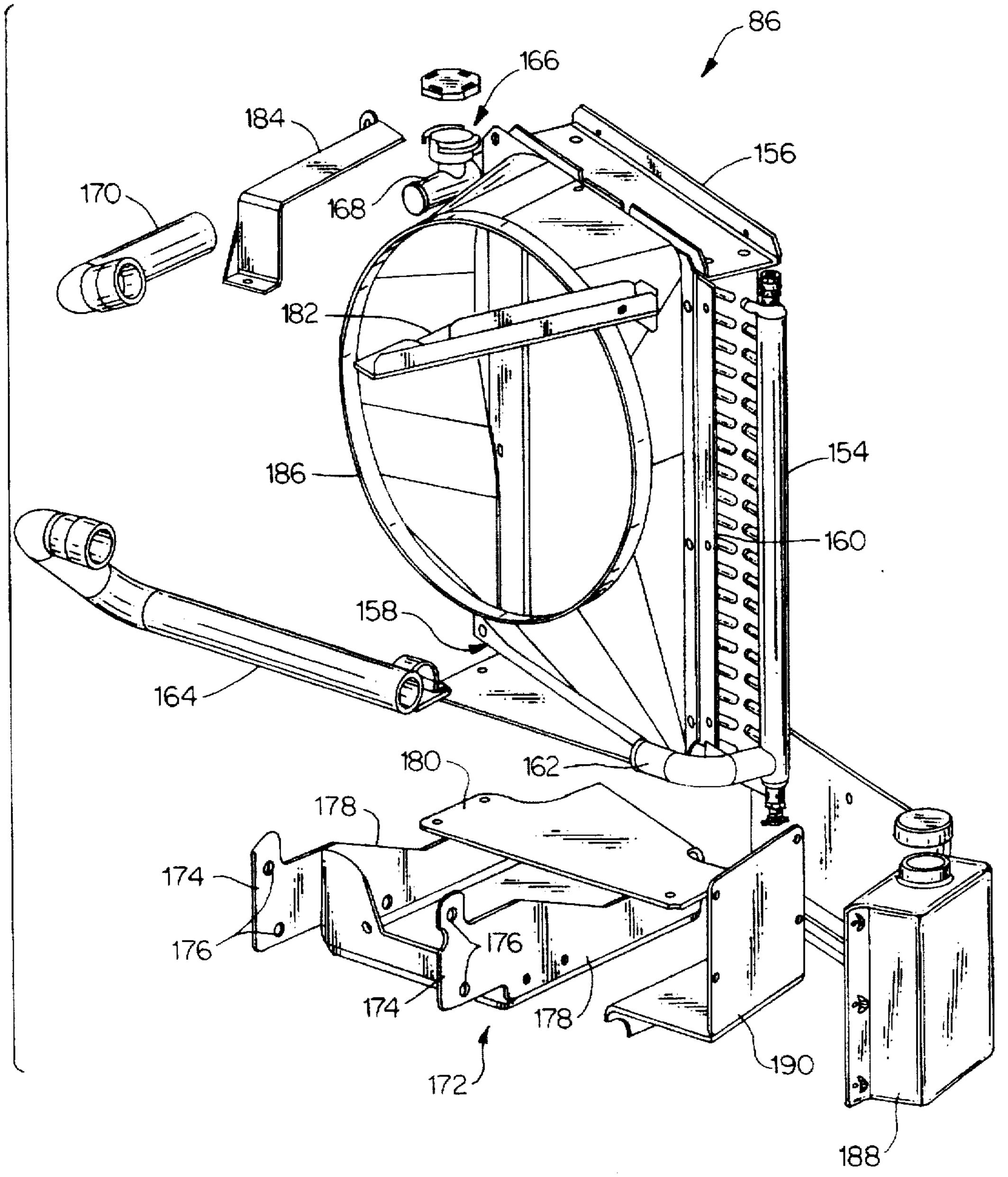
FIG. 11 is an exploded perspective view of the radiator and radiator mounting brackets.

Looking now at FIGS. 2, 3 and 11, the radiator assembly 86 and the mounting thereof to the engine 70 is illustrated. The radiator 154 is of a conventional fin and tube design and includes a structural framework around its periphery as represented by top and bottom mounting channels 156 and 158 and side mounting channels 160. The radiator has a lower hose fitting 162 connected by lower radiator hose 164 to an appropriate coolant connection on the engine and an upper hose fitting 168 likewise connected by an upper hose 170 to an appropriate fitting on the engine. The radiator fill and cap 166 are located in the upper hose fitting 168.

As is best shown in from FIG. 3, the radiator 154 is mounted at an angle to the engine 70. The main radiator mounting bracket 172 comprises a pair of parallel plates 178 having mounting ears 174, which are adapted to be structurally attached to the engine 70 by way of appropriate threaded fasteners through openings 176 provided in the mounting ears. The plates 178, in turn support an angularly disposed radiator support plate 180 to which the bottom channel 158 of the radiator is attached. The radiator is further attached to the engine by a first upper support bracket 182 extending from the upper end of the radiator where it is attached to the upper end of one of the side channels 160. A second upper mounting bracket 184 is attached to the side channel 160 on the other side of the radiator, adjacent the upper hose fitting 168, and extends to a suitable structural mounting point on the engine 70.

A formed plastic venturi 186 is attached to the various channels 156, 158 and 160 surrounding the radiator and transitions to a circular cross section, which receives the radiator fan (not shown). A coolant recovery tank 188 is mounted to an appropriate bracket 190 attached to one of the support plates 178.

As thus described, the powertray 50 of the generator set 10 is installed and fully operational within the supporting framework of the generator set defined by the fuel tank 12 and other structural elements described above. When it is necessary to remove the powertray 50 from the generator set, only the following mechanical and service disconnections need be made. First, the two fuel lines, i.e. the fuel supply line 90 and the fuel return line 91, are disconnected from their fittings 92 and 93, respectively, by removal of the appropriate clamps.

Second, the clamp 130 attaching the exhaust pipe 58 to the muffler outlet is removed. Third, the five shock mount mounting bolts are removed. And, finally, the power cable 66 is disconnected from the receptacle box 68 by disconnecting the elbow 134.

At this point, the entire power tray 50 may be removed from the unit as illustrated in FIG. 7. It will be appreciated that the unit may then be appropriately serviced and replaced in an equally simple manner or immediately replaced with a replacement unit while the removed unit is being serviced.

What is claimed is:

1. A serf contained engine driven electrical generator comprising:

a support section which comprises: a fuel tank defining a structural support surface, and, a plurality of mounting devices located on said structural support surface; and a power generation section, which comprises: an engine, an electrical generator drivingly coupled to said engine, and, radiator means for cooling said engine structurally attached to said engine, said engine and said generator having a plurality of mounting devices associated therewith, each located so as to align with one of said mounting devices on said structural support surface when said power generator section is placed on said support surface; and means for interconnecting said mounting devices on said support surface with said mounting devices on said engine and said generator with which they are aligned.

2. The apparatus of claim 1 wherein said means for interconnecting are adapted to be readily installed to attach said power generation section to said support section and to be readily removed to facilitate removal of said power generator section from said support section.

3. The apparatus of claim 2 wherein said mounting devices located on said structural support surface comprise threaded openings; and wherein said means for interconnecting comprise: shock mount assemblies adapted to structurally engage said mounting devices associated with said engine and said generator, and further include a single attaching bolt extending through each shock mount means and threadably engaging said threaded openings in said structural support surface to thereby interconnect said motor and generator to said support surface, through shock mount.

4. The apparatus of claim 1 wherein said fuel tank further includes a fuel supply fitting and fuel return fitting;

and wherein said engine of said power generation section comprises a fuel supply line and a fuel return line;

further including means for connecting said fuel line to said fuel supply fitting in a manner facilitating easy connection and disconnection; and means for connecting said fuel return line to said fuel return fitting in a manner facilitating easy connection and disconnection.

5. The apparatus of claim 1 wherein said support section further comprises a structural element vertically spaced from said structural support surface of said fuel tank, said structural support element having a mounting device attached thereto; and wherein said engine has a mounting device associated therewith located so as to align with said mounting device carried by said structural element; and means for interconnecting said mounting device carried by said structural element and said mounting device aligned therewith on said engine.

6. The apparatus of claim 5 wherein said support section further includes a power receptacle box mounted thereto; and wherein said power generation section further includes a power cable for conducting electrical power therethrough; and means for electrically interconnecting said power cable to said receptacle box in a manner facilitating attachment and reattachment of said power cable to said receptacle box.

7. The apparatus of claim 6 wherein said power generation section further includes a control box structurally attached thereto as an integral part thereof.

8. The apparatus of claim 7 wherein said power generation section further comprises a battery for providing power to starting said engine, and a battery charger, both integrally supported therewith.

9. The apparatus of claim 8 wherein said power generation section further comprises an air filter for said engine, a fuel filter for said engine, and a muffler for said engine, all integrally structurally supported by said power generation section.

10. The apparatus of claim 9 wherein said muffler has an exhaust opening; an exhaust pipe adapted to be coupled to said exhaust opening of said muffler; and, means for attaching one end of said exhaust pipe to said muffler opening in a manner to allow easy attachment and detachment thereof.

11. A self contained engine driven electrical generator comprising: a support section, which comprises a fuel tank having a lower section defining a substantially horizontal structural support surface, and a pair of vertically extending spaced apart fuel tank sections, said support section further comprising a substantially horizontally extending structural element attached to and interconnecting the upper ends of said vertically extending fuel tank sections; said structural support surface including a plurality of mounting devices located thereon; and at least one mounting device located on said horizontally extending structural support, in a manner such that it is vertically spaced from said structural support surface of said fuel tank; and a power generation section, which comprises: an engine, an electrical generator drivingly coupled to said engine, and, radiator means for cooling said engine structurally attached to said engine, said engine and said generator having a plurality of mounting devices associated therewith, each located so as to align with one of said mounting devices on said structural support surface when said power generation section is placed on said support surface, said engine having a mounting device associated therewith at the upper end thereof located so as to align with said mounting device on said horizontally extending structural member when said power generation section is placed on said support surface; and means for connecting each of said mounting devices on said support surface and said horizontally extending structural element with said mounting devices on said engine and said generator with which they are aligned.

12. The apparatus of claim 11 wherein said power generation section further comprises a control box for the engine and electrical generator.

13. The apparatus of claim 12 wherein said support section includes a receptacle box mounted thereto; and wherein said power generation section includes a power cable, one end of which communicates with said generator; and, means for electrically interconnecting the other end of said power cable with said receptacle box in a manner which facilitates easy attachment and removal therefrom.

* * * * *